Oct. 15, 1957    L. WALLERSTEIN, JR    2,809,724
FRICTION DAMPER

Filed May 27, 1954    2 Sheets-Sheet 1

INVENTOR.
Leon Wallerstein Jr
BY
Ralph Hamwar
Attorney

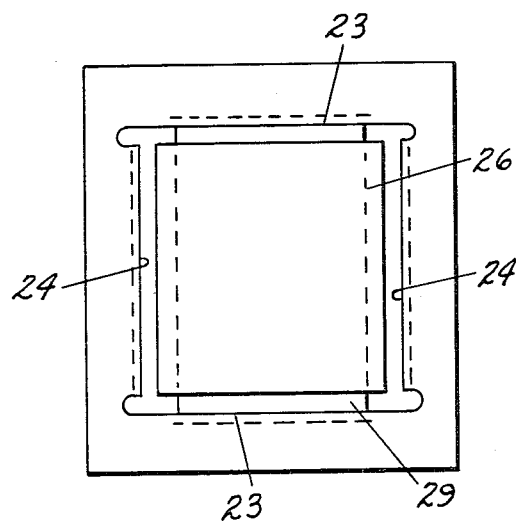
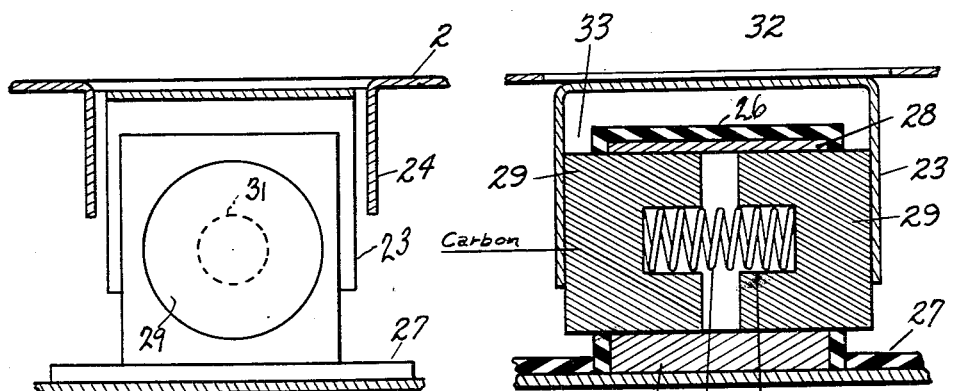

United States Patent Office 2,809,724
Patented Oct. 15, 1957

2,809,724
FRICTION DAMPER

Leon Wallerstein, Jr., Erie, Pa., assignor to Lord Manufacturing Company, Erie, Pa., a corporation of Pennsylvania Application May 27, 1954, Serial No. 432,850

2 Claims. (Cl. 188—129)

This application is a continuation-in-part of application Serial No. 77,543, filed February 21, 1949, now Patent No. 2,685,425.

This invention is intended to provide a friction damper for use with vibration isolating mountings in which the damper does not modify the mounting spring rate and in which the friction material is protected from shock. In a preferred form, the friction material is graphite which provides an essentially constant coefficient of friction throughout the life of the damper.

Figure 1:
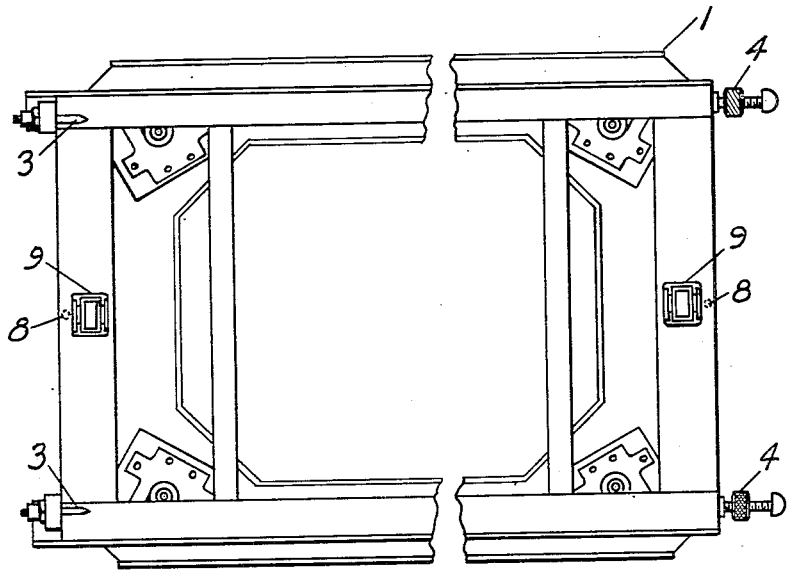
Figure 2:
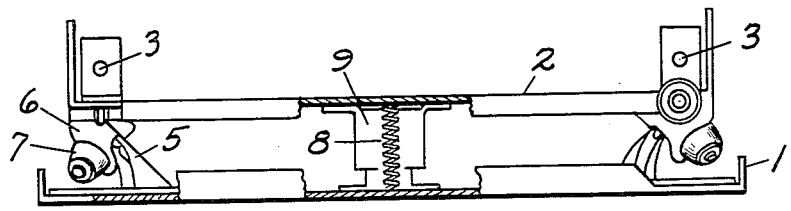
Figure 4:
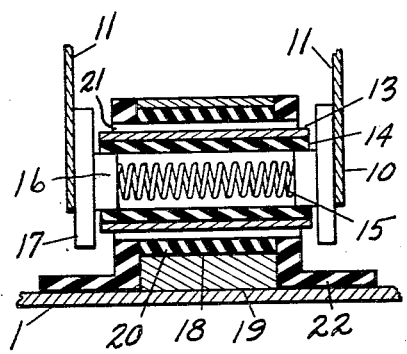
Figure 3:
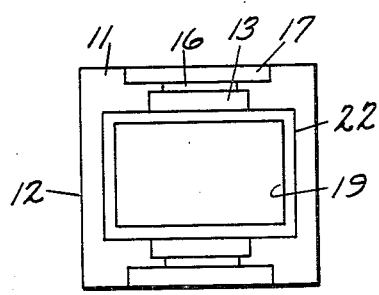

In the drawing, Fig. 1 is a top plan view of a resilient mounting system including friction dampers, Fig. 2 is an end view, Fig. 3 is a top view of one of the friction dampers, Fig. 4 is a section on line 4—4 of Fig. 3, Fig. 5 is a section similar to Fig. 4 through a modification, Fig. 6 is a top view of the modification, and Fig. 7 is a side view of the modification.

The invention is shown applied to the mounting system described in greater detail in application Serial No. 77,543 filed February 21, 1949. As there described the mounting system comprises a base 1 and a frame 2 provided with pins 3 and hold down clamps 4 for attaching the supported body to the frame. On the upper side of the base at each end are pairs of brackets 5 and on the under side of the frame are brackets 6 connected to spaced parts of bodies 7 of resilient material such as rubber and providing a resilient load carrying mounting connection between the frame and base. Between the frame and base at each end are coil springs 8 which are precompressed so as to exert an upward force on the frame substantially equal to the combined weight of the frame and the body to be supported thereby. The springs 8 have a very flat spring rate in the sense that the force exerted by the springs is substantially independent of the position of the frame 2. These springs 8 relieve the mountings 7 of the greater part of the gravity load so that the mountings function substantially solely to resist vibration.

The large amplitude vibrations occurring during shock or resonance conditions are damped by friction dampers 9 adjacent the springs 8 and shown in greater detail in Figs. 3 and 4. The friction dampers comprise a box-shaped member 10 fixed to the underside of the frame 2 and having end walls 11 spaced apart along the longitudinal axis of the mounting system and cross walls 12. Between the end walls 11 is a cylindrical metal tube 13 lined with a rubber tube 14 housing a coil compression spring 15 which bears against hubs 16 on friction washers 17. The spring 15 maintains a friction contact between the washers 17 and the end walls 11. The metal tube 15 is received in a cylindrical opening 18 in a bracket 19 fixed to the base 1. The cylindrical opening 18 is lined with a rubber tube 20 which has a clearance 21 between it and the outer surface of the metal tube 13. So long as the vibration of the frame 2 relative to the base 1 is of insufficient amplitude to take up the clearance 21, the friction washers 17 and walls 11 move together. Whenever the vibration amplitude of the frame exceeds the clearance 21 the tube 13 strikes against the rubber lining 20 and thereafter the washers 17 slide on the walls 11 introducing a friction dampening force. From one aspect, the friction dampening is a delayed dampening, or dampening which only comes into effect upon large amplitude vibrations. This is desirable because friction increases the transmission of vibration between the base and frame when the mounting is serving as a vibration isolator. Under normal vibration amplitudes, friction dampening is sometimes undesirable.

Around the bracket 19 is a rubber bumper 22 which prevents metal-to-metal contact under vibrations of excessive amplitude.

In the modifications shown in Figs. 5, 6, and 7, the frame 2 has rectangularly arranged walls depending from the underside, there being end walls 23 corresponding to the end walls 11 and side walls 24 corresponding to the side walls 12. On the upper surface of the base 1 is fixed a bracket 25 having its top sides and ends covered by a rubber coating 26. A rubber bumper 27 is fixed to the upper side of the base 1 beneath the lower ends of the end walls 23. The bracket 25 has therein a socket 28 slidably receiving blocks 29 of graphite of the same cross-section as the socket which are urged outward against the end walls 23 by a compression spring 30 seated in sockets 31 in the inner end of the blocks 29. The inner ends 32 of the graphite blocks 29 are spaced apart and there is normally a space indicated at 33 between the ends of the bracket 25 and the adjacent faces of the end walls 23. This means that upon extreme movement of the frame 2 relative to the base 1 along the axis of the socket 28 sufficient to take up the space 33, the graphite blocks 29 because they lie entirely within the axial projection of the socket 28 retreat within the socket 28 and the movement of the frame is limited by the striking of one of the end walls 23 against the rubber coating 26 on the outer end surface of the bracket 25. The graphite blocks 29 are accordingly protected from impact which is necessary, because graphite is a brittle material.

One characteristic of all of the dampers illustrated is that the friction damper has no effect upon the spring characteristics of the resilient mounting. The springs 15 or 30 hold the friction damping members 17 or 29 at all times against the end walls 11 or 23 so that no matter how the end walls move, there is no change in the compression of the springs 15 or 30 unless perchance one of the friction damping members should stick in its socket. This means that no matter how the frame 2 moves relative to the base 1 the springs 15 or 30 will not offer any restraint. The friction damping members 17 or 29 resist both vertical and horizontal movement of the frame relative to the base and introduce friction damping limiting the amplitude of vibration of the frame which is particularly effective under resonance or shock conditions.

It should be noted that the damper of Figs. 5, 6, and 7 is effective at all times even for small amplitudes of vibration. Any movement of the frame 2 relative to the base 1 whether up or down or sideways is frictionally resisted by the friction between the graphite blocks 29 and the end walls 23. It has been found that the graphite blocks 29 have ideal damping characteristics in that the coefficient of friction between the graphite blocks and the end walls 23 remain substantially constant throughout the life of the damper independent of changes in ambient conditions. This is an unexpected property of the graphite blocks. It means that the friction dampers always have the same friction damping effect which does not change throughout the life of the mounting system. No particular grade of graphite is necessary, as the constancy of friction damping is a property common to all grades.

Because the graphite blocks 29 are brittle, it is necessary that the blocks be protected from shock or impact which is accomplished in the Fig. 5 damper where under shock or impact, the graphite blocks 29 retreat within the socket 28 and are completely protected.

What is claimed as new is:

1. In a resilient mounting system, a base, a load carrying frame spaced from the base, and a friction damper having parts respectively connected to the frame and base, one of the parts comprising a bracket and the other of the parts having plane walls on each side of the bracket, a clearance opening through said bracket, a tube of smaller diameter than said opening extending between the walls through said clearance opening in the bracket, spring pressed friction members carried by said tube and bearing on said walls, and a rubber bumper between the tube and bracket in spaced relation to said tube.

2. In a resilient mounting system, a base, a load carrying frame spaced from and movable in all directions relative to the base, and a friction damper having parts respectively connected to the frame and base, one of the parts comprising a bracket and the other of the parts having substantially parallel plane walls straddling and spaced from opposite ends of the bracket, said bracket having a socket extending through it transverse to the walls, the length of the socket being less than the space between the walls to provide a gap between each end of the socket and the adjacent wall, a pair of solid graphite blocks of combined length less than the space between the walls slidably carried in the socket in end to end relation with remote ends of the blocks partially projecting out each end of the socket and having flat ends in pressure contact with the adjacent wall, spring means between adjacent ends of the blocks urging the blocks out opposite ends of the socket, the blocks being retractable within the socket and thereby protected from impact.

References Cited in the file of this patent
UNITED STATES PATENTS

| | | |
|---|---|---|
| 1,579,185 | Weiland | Mar. 30, 1926 |
| 1,802,513 | Hull | Apr. 28, 1931 |
| 2,365,842 | Rosenzweig | Dec. 26, 1949 |
| 2,539,530 | Clark | Jan. 30, 1951 |
| 2,685,425 | Wallerstein | Aug. 3, 1954 |